Aug. 13, 1968
O. R. DIETRICH
3,397,378
FLUID-PROOF JUNCTION BOX
Filed Dec. 8, 1965
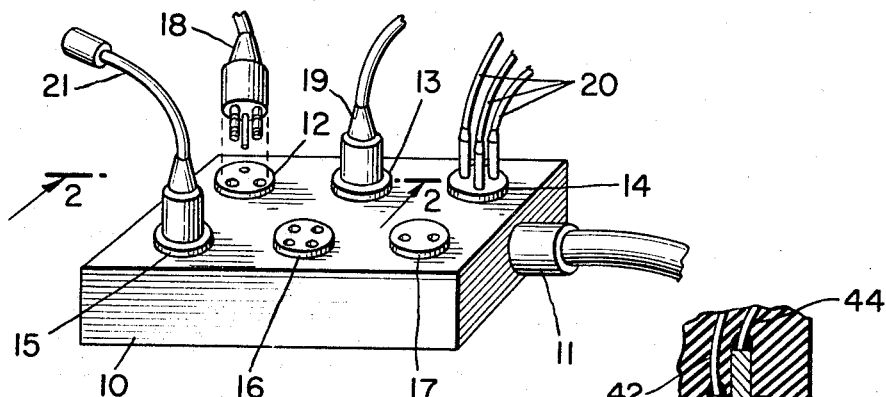
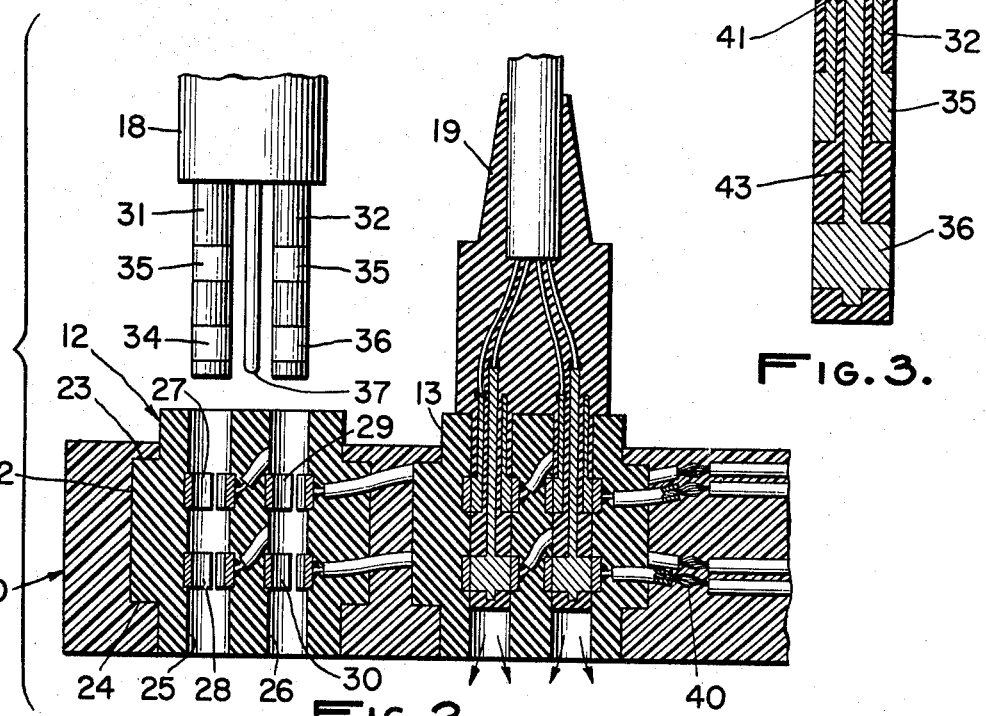
INVENTOR.
ORAN R. DIETRICH
BY
*Elliott & Pastoriza*
ATTORNEYS United States Patent Office 3,397,378
Patented Aug. 13, 1968

3,397,378
FLUID-PROOF JUNCTION BOX
Oran R. Dietrich, Encinitas, Calif., assignor, by mesne assignments, to Electro Oceanics, Inc., a corporation of California
Filed Dec. 8, 1965, Ser. No. 512,340
3 Claims. (Cl. 339—60)

ABSTRACT OF THE DISCLOSURE

A fluid-proof junction box for connecting underwater cables is provided in the form of several socket bodies of insulating material having elongated sockets passing therethrough imbedded as by molding within a plastic body holding the various sockets in fixed relationship to each other. A cable extends into the plastic material to connect to specific contacts on the interior walls of each of the elongated sockets. Connections are effected by inserting elongated plugs of corresponding dimensions to the sockets through one open end of the socket thereby urging water within the socket out the other open end and effecting a wiping action so that engagement of a plug contact on the exterior surface of the plug intermediate its ends with the internal socket contact is effected and the connection maintained in a clean and dry condition even though the connection is effected under water.

---

This invention relates to electrical connectors and more particularly to a novel junction box for effecting multiple connections to a single input cable connected to the junction box, all in a fluid proof manner.

While the junction box is primarily designed for making connections under water, it is equally useful for making connections in other fluid environments, including gases such as in an explosive atmosphere wherein any exposure of the connecting contacts to the atmosphere while making or breaking a connection could result in a possible explosion from arcing and the like. Since the features of the junction box which render it water tight also apply to its use in other fluid environments, such as moist air or explosive gases, the preferred embodiment of the invention will be described with respect to underwater operations.

In many underwater operations such as salvaging, scientific investigations, and other activities wherein communication and electrical power lines are usually necessary, it is convenient to provide an underwater device analogous to a junction box such as employed in conventional electrical applications. The junction box itself, for example, would be secured to the bulkhead of a bathyscaphe or other vehicle used under water or could be carried directly by a diver to facilitate the connection and disconnection of multiple cables to a single power input cable or other input communication line.

Various different types of single and multiple underwater connectors are known and described in copending patent applications, Ser. No. 490,256, filed Sept. 27, 1965, now Patent No. 3,277,424, and entitled "Fluid Proof Connector"; and Ser. No. 490,250, filed Sept. 27, 1965, now Patent No. 3,271,727, and entitled, "Fluid Proof Multiple Connector." These copending patent applications in turn constitute continuation-in-part applications of application Ser. No. 265,881, filed Mar. 18, 1963, and entitled, "Electrical Connector," now abandoned.

In any type of underwater junction box, it is desirable to provide multiple socket outlets adapted to receive the various different types of single and multiple plugs described in the foregoing co-pending applications. Further, it is of extreme importance that the junction box connections be effected in the manner described in the copending applications such that complete water-proofing is assured and the engaging contacts themselves are protected from surrounding water once a connection has been effected.

Other important considerations include those discussed with respect to single connectors in the foregoing co-pending applications involving equalized pressure to facilitate connecting and removing plugs from the junction box, together with the desired wiping action of contacts during the making and breaking of a connection.

Still another important consideration in a junction box structure results from the fact that not all of the various oulet sockets in the junction box may be employed at one time. It is thus necessary that such a structure include some means for shielding sockets not in use.

With all of the foregoing considerations in mind, it is accordingly a primary object of the present invention to provide a novel fluid proof junction box for use primarily under water wherein various underwater plug connectors such as referred to in the above-identified co-pending applications may be used, all to the end that multiple connections can be effected at a single location at which the junction box is disposed.

More particularly, it is an object to provide a junction box structure capable of providing a plurality of socket body outlets for receiving various different types of single or multiple plugs with all of the attendant advantages of fluid tightness and integrity of connection provided by the single underwater connectors heretofore known.

Still another object of this invention is to provide a novel method of making a junction box for underwater use wherein various modular type socket bodies may be incorporated and their interconnections held in a desired position relative to each other so as to provide a desired junction box configuration.

Still another object of this invention is to provide a novel method and means for electrically connecting a single input cable incorporating multiple conductors to various socket bodies held in fixed relation to each other to define the entire junction box in a manner to insure complete fluid proofing.

Briefly, these and many other objects and advantages of this invention are attained by providing a plurality of pre-molded socket bodies in a desired array and held in spaced fixed relationhip relative to each other by a surrounding plastic material such as an epoxy resin. The various sockets are interconnected with an input cable, these interconnections being submerged in and protected by the surrounding plastic so that they are completely fluid proof. The pre-molded socket bodies themselves are modular in form so that several different types of sockets may be positioned in a desired array prior to the application of the surrounding plastic.

With respect to the foregoing, the method of the invention thus contemplates the primary steps of positioning pre-molded socket bodies and their interconnections in a desired configuration within a mold and then pouring plastic into the mold to a level slightly below the exposed upper ends of the socket bodies. The plastic itself, after hardening, holds the various socket bodies in the desired configuration to provide the completed junction box.

A better understanding of the method and the junction box itself will be had by now referring to one embodiment thereof in conjunction with the accompanying drawings, in which:

FIGURE 1 is a perspective view of a junction box illustrating several different types of plugs useable therewith;

FIGURE 2 is an enlarged fragmentary cross-section of the junction box taken in the direction of the arrows 2—2 of FIGURE 1 preparatory to receiving a plug, a fragmentary portion of which is shown in full lines;

FIGURE 3 is an enlarged fragmentary cross-section of a portion of the plug illustrated in FIGURE 2; and, FIGURE 4 is a fragmentary cross-section of another one of the plugs illustrated in FIGURE 1 serving as a dummy plug.

Referring first to FIGURE 1, there is shown a junction box 10 having an input cable 11 for distributing power or communication signals to various socket bodies such as indicated at 12, 13, 14, 15, 16, and 17. Suitable underwater plug connectors, such as indicated at 18 and 19 and which may correspond to the multiple plug connectors disclosed and claimed in the heretofore referred to copending applications, are adapted to be received in the sockets 12 and 13, respectively. In addition, single underwater connectors such as indicated at 20 may be received in various socket openings formed in the socket body 14.

In the socket body 15, there is shown, merely by way of an example, a blind plug 21 from which no electrical leads extend. This plug is for the purpose of closing the socket openings in the socket body 15. Similar blind plugs would be provided in the sockets 16 and 17 in the event other electrically connecting plugs were not secured therein.

Referring now to the enlarged fragmentary cross-section of FIGURE 2, it will be noted that the socket bodies 12 and 13 constitute integrally molded body structures generally cylindrical in shape. The particular sockets 12 and 13, for purposes of illustration, are identical; and, therefore, description of one will suffice for both.

Thus, referring to the integrally molded socket body 12, it will be noted that the central peripheral portion is enlarged as at 22 to define upper and lower annular shoulders 23 and 24 adjacent to the upper and lower ends of the socket body. The socket body also includes first and second elongated sockets 25 and 26 passing entirely through the body between the upper and lower ends to open out both ends. Embedded within the interior wall of each of the sockets 25 and 26 are socket contacts, such as indicated at 27 and 28, for the socket 25 and 29 and 30 for the socket 26. Preferably, each of these contacts constitutes a split ring embedded within the interior wall but having an exposed inner surface portion which projects slightly radially inwardly of the interior wall. The split ring structure provides a resilient metallic contact which can circumferentially expand to a position in which its interior surface is substantially flush with the interior wall of the socket body.

The respective sockets 25 and 26 are adapted to receive plug members 31 and 32 constituting part of the plug body 18. These plug members include exterior contacts 33 and 34, for the plug 31, and 35 and 36, for the plug 32. The manner in which these plug contacts are formed and connected within the plug body 18 will be described in detail subsequently. A polarizing pin 37 is arranged to be received within a third opening in the socket body 12 (not shown) so that the proper plugs will be received in the proper corresponding sockets.

The plugs 31 and 32 have exterior dimensions corresponding substantially to the interior dimensions of the sockets 25 and 26 so that when the same are inserted into the sockets, there will be a frictional engagement of the exterior surface of the plugs with the interior surface of the sockets. As a consequence, when the device is under water and a connection is being effected, insertion of the plugs into the sockets will urge water out of the sockets from the lower ends thereof. This action is illustrated by the arrows 38 for the socket body 13 wherein the plug 19 has been fully inserted.

The actual connection of the plugs within the sockets results in a wiping action, all as fully described and claimed for single plug and socket assemblies in the referred to co-pending patent applications which results in there being provided intimate engagement of the insulated portions of the plugs and the insulated interior wall portions of the sockets on either side of the respective contacts so that the contacts are rendered water tight.

It will be evident in FIGURE 2 that the various socket bodies 12 and 13 may be pre-molded modular structures. In accordance with the method of the invention, as described heretofore, an array of these socket bodies are positioned in a mold and a liquid plastic then poured into the mold. When the plastic hardens, it will appear as indicated at 10 and will lock the socket bodies in place since it overlaps the annular upper and lower shoulders 23 and 24. The socket bodies are thus held in a desired fixed relationship to each other.

The plastic employed preferably constitutes an epoxy. This epoxy not only serves as an excellent insulation but also to provide a support and insulating means for various conductors connected to the socket contacts within the socket bodies. In this respect, lead-out wires are shown for the socket contacts, such as indicated at 39 for one of the socket contacts of the socket body 13. In accordance with a feature of the invention, prior to pouring the plastic material into the mold, a portion of the lead-out wire 39 is stripped of insulation to provide a bare portion of wire as indicated at 40. When the plastic is poured into the mold, it completely encompasses in intimate engagement the entire bare surface of the wire 40 such that should a strand type of wire be employed, all the interstices between the strands will be filled with the plastic, thereby insuring a completely watertight or fluid proof juncture at the point that the wire enters into the socket body 13.

The various conductors extending from the socket bodies connect into the input cable 11 shown in FIGURE 1. This input cable itself may be properly positioned at the time the liquid plastic is poured into the mold so that it will be integrally formed and extend from a side of the hardened plastic defining the junction box structure. Thus, the plastic itself serves to insulate and support the various interconnections between the sockets and conductors in the cable 11.

FIGURE 3 illustrates in enlarged cross-section the plug 32 which is typical of the other plugs for either single or multiple plug body connectors. As shown, the contact 35 constitutes an enlarged portion of a tubular structure 41 extending from the main body portion of the plug body 18. This tubular member 41 serves as an electrical connecting means for connecting a wire 42 to the contact 35. Within the tube is an elongated solid rod 43 having an enlarged portion near its end to define the second plug contact 36. A suitable connection to this rod is indicated at 44 in the major portion of the plug body 18. The rod 43 serves as a stiffening member as well as a means for effecting a connection to the contact 36.

The axial spacing between the contacts 35 and 36 relative to each other as well as to the enlarged body portion of the plug body from which the plug 32 extends is such that when the under side of the plug body adjacent the plug 32 engages the top end of the socket, the plug contacts will be juxtaposed and in engagement with the split ring contacts in the corresponding socket.

While two contacts have been shown on each plug, it will, of course, be understood that each plug need only carry one contact and each corresponding socket need only incorporate one split ring. Alternatively, the plugs and sockets could include three or more axially spaced contacts.

Referring now to FIGURE 4, details of the dummy plug 21 are shown. As indicated, the plug body includes elongated plugs 45 and 46 having external dimensions corresponding to the internal dimensions of the socket into which it is designed to be received. The exterior of the plugs includes contacts such as indicated at 47 and 48 and at 49 and 50, respectively, for engaging the split ring contacts in the corresponding sockets. However, these contacts are not electrically connected in any manner but only serve to provide a geometry identical to a normal plug which would include electrical contacts. In this respect, the contacts 48 and 50 may each constitute an enlargement of a central elongated stiffening rod such as indicated at 51 for the plug 45. The other contact such as the contact 47 constitutes an enlargement of a tube wholly insulated from the rod 51. It will be noted that the left ends of the rods and tubes simply terminate in the insulation constituting the body of the blind plug 21. This material, as well as the material for the various socket bodies, preferably constitutes neoprene, an ideal elastomer which is non-wettable and an excellent electrical insulator.

The purpose for the dummy plugs, such as the plug 21 described in FIGURE 4 and illustrated in FIGURE 1, is simply to fill the sockets in any socket body to which an electrical plug is not connected. This is important as, otherwise, fluid within the elongated socket openings would simply short circuit the various split ring contacts therein. Thus, for various sockets not in use, it is a simple matter to insert the dummy plugs as illustrated at 21 for the socket 15.

Analogous single plug dummy members would be provided in the event not all of the socket openings in any one socket body were employed. There is thus possible a variety of different types of connections with respect to the junction box illustrated.

It will be evident that all of the advantages fully set forth in the co-pending applications referred to with respect to effecting a watertight, underwater connection are realized by the junction box structure of this invention.

While the exterior dimensions of the plug have been defined as corresponding substantially to the interior dimensions of the sockets, it is meant by these terms that the dimensions are such as to realize the desired interference type fit or snug fitness configuration sufficient to provide a complete water or fluid proofing. Thus, the socket openings in the socket bodies could be purposely molded to a slightly smaller internal diameter than the external diameters of the plugs, thereby resulting in a force-fit, the internal diameters expanding somewhat as a consequence of the resilient material of the sockets. These very slight differences in diameter or dimensioning are deemed to be encompassed within the statement that the dimensions substantially correspond.

What is claimed is:

1. A fluid proof junction box comprising, in combination: at least two socket bodies, each socket body having at least one elongated socket extending therethrough; at least one socket contact on the interior wall of said socket intermediate the open ends of said socket; a conductor connected to said socket contact and extending laterally from said socket body; a surrounding plastic material in intimate engagement with exterior portions of said socket bodies and conductors extending therefrom to hold said bodies in a fixed relationship to each other; and an input cable passing into said plastic material and connected to said conductor, said elongated socket being open only at its ends whereby insertion into one of said sockets of an elongated plug of exterior dimensions corresponding to the interior dimensions of said socket, urges fluid from the open opposite end of said socket and wipes the interior of said socket dry on either side of said socket contact.

2. An underwater junction box for providing a power distribution means between an input cable and a plurality of output cables wherein one or more of said output cables may be connected or disconnected to said junction box while underwater, comprising, in combination: a plurality of integrally molded socket bodies, each of said bodies being of cylindrical shape with an enlarged diameter body portion between its ends to define annular shoulders; a plastic material surrounding said bodies and in intimate contact with the exterior surfaces of said bodies beyond said annular shoulders except for the opposite ends of said bodies, to hold said bodies in fixed relationship to each other, each socket body including at least one elongated socket extending entirely through said body from one end to the other; at least one socket contact embedded in the interior wall of said socket; and a conductor extending from said socket contact and socket body into said surrounding plastic for connection to said input cable, whereby insertion of a plug of diameter corresponding to the diameter of said socket and having a plug contact on its peripheral surface, into one end of said socket urges water out the opposite end of said socket and effects a wiping action on the interior surface of said socket, sufficient insertion positioning said plug contact into engagement with said socket contact, the portions of said plug and socket on either side of said contacts providing a fluid proofing of said contacts.

3. A junction box according to claim 2, in which said input cable is integrally formed in said plastic, at least a portion of said conductor from said socket contact in said plastic being bare so that said surrounding plastic intimately engages the exposed surfaces of said portion of said conductor.

References Cited

UNITED STATES PATENTS

| | | | |
|---|---|---|---|
| 1,969,529 | 8/1934 | Shafer | 339—198 |
| 2,148,201 | 2/1939 | Hovwink. | |
| 2,428,323 | 9/1947 | Winer | 174—77 |
| 2,701,867 | 2/1955 | Obenschain et al. | 339—102 |
| 3,271,727 | 9/1966 | Nelson | 339—60 |

FOREIGN PATENTS 1,313,037  11/1962  France.

MARVIN A. CHAMPION, *Primary Examiner.*

J. H. McGLYNN, *Assistant Examiner.*